(12) United States Patent
Colgate et al.

(10) Patent No.: US 8,791,902 B2
(45) Date of Patent: Jul. 29, 2014

(54) HAPTIC DEVICE WITH CONTROLLED TRACTION FORCES

(71) Applicant: Northwestern University, Evanston, IL (US)

(72) Inventors: James Edward Colgate, Evanston, IL (US); Michael A. Peshkin, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 13/928,611

(22) Filed: Jun. 27, 2013

(65) Prior Publication Data

US 2013/0314220 A1 Nov. 28, 2013

Related U.S. Application Data

(63) Continuation of application No. 12/589,178, filed on Oct. 19, 2009, now Pat. No. 8,525,778, which is a continuation-in-part of application No. 11/726,391, filed on Mar. 21, 2007, now Pat. No. 8,405,618.

(60) Provisional application No. 61/196,660, filed on Oct. 20, 2008.

(51) Int. Cl.
*G09G 5/00* (2006.01)
*G06F 3/041* (2006.01)

(52) U.S. Cl.
USPC .......................................... 345/156; 345/173

(58) Field of Classification Search
USPC .......................................................... 345/156
See application file for complete search history.

(56) References Cited

U.S. PATENT DOCUMENTS

| | | | |
|---|---|---|---|
| 4,352,961 A | 10/1982 | Kumada et al. |
| 4,686,407 A | 8/1987 | Ceperley |
| 4,812,698 A | 3/1989 | Chida et al. |
| 5,055,962 A | 10/1991 | Peterson et al. |
| 5,184,319 A | 2/1993 | Kramer |
| 5,235,225 A | 8/1993 | Colgate et al. |
| 5,561,337 A | 10/1996 | Toda |
| 5,587,937 A | 12/1996 | Massie et al. |
| 5,631,861 A | 5/1997 | Kramer |
| 5,673,041 A | 9/1997 | Chatigny et al. |
| 5,709,219 A | 1/1998 | Chen et al. |
| 5,760,530 A | 6/1998 | Kolesar |

(Continued)

FOREIGN PATENT DOCUMENTS

| | | |
|---|---|---|
| JP | 2001-255993 | 9/2001 |
| JP | 2002/226140 | 8/2002 |

(Continued)

OTHER PUBLICATIONS

Biggs, James S., Haptic Interfaces, Chapter 5, pp. 93-115, Published by Lawrence Erlbaum Associates, 2002.

(Continued)

*Primary Examiner* — Charles V Hicks
(74) *Attorney, Agent, or Firm* — Cook Alex Ltd.

(57) ABSTRACT

A haptic device includes a substrate that is subjected to lateral motion such as lateral oscillation with one or more degrees of freedom together with modulation of a friction reducing oscillation in a manner that can create a shear force on the user's finger or on an object on the device.

27 Claims, 14 Drawing Sheets

(56) References Cited

U.S. PATENT DOCUMENTS

| | | | |
|---|---|---|---|
| 6,042,555 | A | 3/2000 | Kramer et al. |
| 6,059,506 | A | 5/2000 | Kramer |
| 6,337,678 | B1 | 1/2002 | Fish |
| 6,351,054 | B1 | 2/2002 | Cabuz et al. |
| 6,429,846 | B2 | 8/2002 | Rosenberg et al. |
| 6,570,299 | B2 | 5/2003 | Takeshima et al. |
| 6,819,990 | B2 | 11/2004 | Ichinose |
| 6,970,160 | B2 | 11/2005 | Mulligan et al. |
| 6,979,164 | B2 | 12/2005 | Kramer |
| 7,148,875 | B2 | 12/2006 | Rosenberg et al. |
| 7,271,707 | B2 | 9/2007 | Gonzales |
| 7,271,945 | B2 | 9/2007 | Hagood et al. |
| 7,390,157 | B2 | 6/2008 | Kramer |
| 2001/0026266 | A1 | 10/2001 | Schena et al. |
| 2001/0043847 | A1 | 11/2001 | Kramer |
| 2002/0186208 | A1 | 12/2002 | Feldman et al. |
| 2003/0025721 | A1 | 2/2003 | Clapper et al. |
| 2003/0038645 | A1 | 2/2003 | Ishii |
| 2003/0038776 | A1 | 2/2003 | Rosenberg et al. |
| 2003/0076297 | A1 | 4/2003 | Hasser |
| 2003/0151597 | A1 | 8/2003 | Roberts et al. |
| 2003/0179190 | A1 | 9/2003 | Franzen |
| 2003/0193475 | A1* | 10/2003 | Rosenberg et al. ............ 345/156 |
| 2004/0108992 | A1* | 6/2004 | Rosenberg ................... 345/156 |
| 2004/0237669 | A1 | 12/2004 | Hayward et al. |
| 2005/0017947 | A1 | 1/2005 | Shahoian et al. |
| 2005/0030292 | A1 | 2/2005 | Diederiks |
| 2005/0037862 | A1 | 2/2005 | Hagood et al. |
| 2005/0057527 | A1 | 3/2005 | Takenaka et al. |
| 2005/0173231 | A1 | 8/2005 | Gonzales |
| 2006/0097996 | A1 | 5/2006 | Tabata |
| 2006/0115348 | A1 | 6/2006 | Kramer |
| 2006/0187201 | A1* | 8/2006 | Rosenberg et al. ............ 345/156 |
| 2006/0209037 | A1 | 9/2006 | Wang et al. |
| 2006/0244732 | A1 | 11/2006 | Geaghan |
| 2006/0279548 | A1 | 12/2006 | Geaghan |
| 2006/0284839 | A1 | 12/2006 | Breed et al. |
| 2007/0146317 | A1 | 6/2007 | Schena |
| 2007/0182708 | A1 | 8/2007 | Poupyrev et al. |
| 2007/0236450 | A1 | 10/2007 | Colgate et al. |
| 2007/0236474 | A1 | 10/2007 | Ramstein |
| 2008/0060856 | A1 | 3/2008 | Shahoian et al. |
| 2008/0062143 | A1 | 3/2008 | Shahoian et al. |
| 2008/0062144 | A1 | 3/2008 | Shahoian et al. |
| 2008/0062145 | A1 | 3/2008 | Shahoian et al. |
| 2008/0068351 | A1 | 3/2008 | Rosenberg et al. |
| 2008/0111447 | A1 | 5/2008 | Matsuki |
| 2008/0129705 | A1 | 6/2008 | Kim et al. |
| 2008/0170037 | A1 | 7/2008 | Cruz-Hernandez et al. |
| 2008/0198139 | A1 | 8/2008 | Lacroix et al. |
| 2008/0231612 | A1 | 9/2008 | Hill et al. |
| 2008/0296072 | A1 | 12/2008 | Takashima et al. |
| 2009/0053643 | A1 | 2/2009 | Kawata |
| 2009/0209104 | A1 | 8/2009 | Kimura |
| 2010/0079379 | A1 | 4/2010 | Demuynck et al. |

FOREIGN PATENT DOCUMENTS

| | | |
|---|---|---|
| JP | 2006-163206 | 6/2006 |
| JP | 2006-228151 | 8/2006 |
| JP | 2008/287402 | 11/2008 |
| JP | 2008-287402 | 11/2008 |
| WO | WO 2008/093965 | 8/2008 |

OTHER PUBLICATIONS

Bolanowski et al., Four Channels Mediate the Mechanical Aspect of Touch, J. Acoust. Soc. Am., 84 (5), pp. 1680-1694, Nov. 1988.

Dimitriadis et al., Piezoelectric Actuators for Distributed Vibration Excitation of Thin Plates, Journal of Vibration and Acoustics, vol. 133, pp. 100-107, 1991.

Glassmire, John, Study and Design of a Variable Friction Haptic Display, Thesis, http://lims.mech.northwestern.edu/papers/glassmire06/GlassmireMaster.pdf.

Hagood et al., Damping of Structural Vibrations with Piezoelectric Materials and Passive Electrical Networks, Journal of Sound and Vibration, 146(2), pp. 243-268, 1991.

Levesque et al., Experimental Evidence of Lateral Skin Strain During Tactile Exploration, Proc. Of Eurohaptics, Dublin, Ireland, Jul. 2003.

Minsky et al., Feeling and Seeing: Issues in Force Display, Symposium on Interactive 3D Graphics, Proceedings of 1990 Symposium, Snowbird, Utah, pp. 235-243, 270. 1990.

Moheimani, S.O., A Survey of Recent Innovations in Vibration Damping and Control Using Shunted Piezoelectric Transducers, IEEE Trans on Control Systems, vol. 11, No. 4, pp. 482-494, Jul. 2003.

Pasquero, et al., Stress: A practical tactile display system with one millimeter spacial resolution and 700 Hz refresh rate, Proc. Of Eurohaptics, Dublin, Ireland, pp. 94-110, Jul. 2003.

Robles-De-La-Torre, Gabriel, Comparing the role of lateral force during active and passive touch etc . . ., Proc. Of Eurohaptics, University of Edinburgh, UK, pp. 159-164, 2002.

Robles-De-La-Torre, Gabriel, Force can overcome object geometry in the perception of shape through active touch, Nature, vol. 412, pp. 445-448, Jul. 2001.

Salbu, E. O. J., Compressible Squeeze Films and Squeeze Bearings, Journal of Basic Engineering, pp. 355-366, 1964.

Takaaki et al., An application of saw to a tactile display in virtual reality, IEEE Ultrasonics Symposium, pp. 1-4, 2000.

Takaaki et al., Surface Acoustic Wave Tactile Display, IEEE Computer Graphics and Applications, pp. 55-63, Nov./Dec. 2001.

Takasaki et al., A surface acoustic wave tactile display with friction control, IEEE Computer Graphics and Applications, IEEE International Conference, pp. 240-243, 2001.

Takasaki et al., Transparent surface acoustic wave tactile display, Intelligent Robot and Systems, (IROS 2005), 2005 IEEE/RSJ International Conference, pp. 3354-3359, Aug. 2005.

Watanabe et al., A method for controlling tactile sensation of surface roughness using ultrasonic vibration, IEEE Intl. Conference on Robotics and Automation, vol. 1, pp. 1134-1139, 1995.

Wiesendanger et al., Squeeze film air bearings using piezoelectric bending elements, 5th Intl. Conference on Motion and Vibration Control, (MOVIC2000) pp. 181-186, 2000.

Yamamoto et al., Electrostatic tactile display for presenting surface roughness sensation, IEEE (ICIT 2003), pp. 680-684, Dec. 2003.

Mallinckrodt, E., et al., Perception by the Skin of . . . Vibrations, Science 1953, 118 (3062): pp. 277-278.

Salbu, Compressible Squeeze Films and Squeeze Bearings, Journal of Basic Engineering, 1964, pp. 355-366.

R. M. Strong and D. E. Troxel, "An electrotactile display," IEEE Trans. Man-Mach Syst., vol. MMS-11, No. I, p. 72-79, 1970.

S. Grimnes, "Eiectrovibration, cutaneous sensation of microampere current," Acta. Physio/.Scand., vol. 118, No. I, pp. 19-25, Jan. 1983.

Kaczmarek, et al., Electrolactile and vibrotactile displays for sensory substitution systems. IEEE Transactions on Biomedical Engineering, 1991, 38(1), pp. 1-16.

Minsky; "Computational Haptics: The Sandpaper System for Synthesizing Texture for a Force-Feedback Display"; PhD Thesis; Massachusetts Institute of Technology, Cambridge, MA, Jul. 6, 1995, pp. 1-217.

Tang, H. and D. Beebe, A microfabricated electrostatic haptic display for persons with visual imairments. IEEE Transactions on Rehabilitation Engineering, 1998. 6(3): pp. 241-248.

Reznik. D; Canny, J, (1998). A flat rigid plate is a universal planar manipulator. In IEEE International Conference on Robotics and Automation.

Masaya Takasaki, et al., A Surface Acoustic Wave Tactile Display with Friction Control, IEEE 2001, pp. 240-243.

D. Wang, K. Tuer, M. Rossi, and J. Shu, "Haptic overlay device for flat panel touch displays," in Symposium on Haptic Interfaces for Virtual Environment and Teleoperation Systems, 2004.

K. Kaczmarek, "Electrotactile Display . . . Report," National Eye Institute grant 5-ROI-EY10019-08, Dec. 23, 2004.

K. Kaczmarek, K. Nammi, A.K. Agarwal, M.E. Tyler, S.J. Haase, and D.J. Beebe. "Polarity effect in electrovibration for tactile display." IEEE Trans on Biomedical Engineering, 53(10):2047-2054, 2006.

(56) References Cited

OTHER PUBLICATIONS

Glassmire, Study and Design of a Variable Friction Haptic Display, Thesis [online], May 13, 2006, [retrieved on Dec. 4, 2010]_http://lims_mech_northwestern.edu/papers/glassmire06/GiassmireMaster_pdf.

Winfield, T-PaD: Tactile pattern display through variable friction reduction, World Haptics Conference, pp. 421-426, 2007.

Y. Kato, T. Sekitani, M. Takamiya, M. Doi, K. Asaka, T. Sakurai, and T. Someya, "Sheet-type braille displays by integrating organic field-effect transistors and polymeric actuators," IEEE Transactions on Electron Devices, vol. 54 No. 2 pp. 202-209 FebrUlliY 2007.

Winfield, A Virtual Texture Display using Ultrasonically Vibrating Plates, Paper [online], Nov. 2007, [retrieved on Dec. 4, 2010]. Http://vroot.org/node/4707.

Biet, Implementation of tactile feedback by modifying the perceived friction, European Physical Journal Appl. Phys., 43:123-135, 2008.

Melisande Biet et al., Discrimination of Virtual Square Gratings by Dynamic Touch on Friction Based Tactile Displays, Symposium on Haptic Interfaces for Virtual Teleoperator Systems, 2008 pp. 41-48.

M. Biet, F. Giraud, and B. Lemaire-Semail, "Implementation of tactile feedback by modifying the perceived friction," The European PhysicaUournal Applied Physics, vol. 43, No. I, pp. 123-135, Jul. 2008.

Notice of Rejection for Japanese Patent Application No. 2012-534155, issued by the Japanese Patent Office dated Dec. 17, 2013. (English Summary).

* cited by examiner

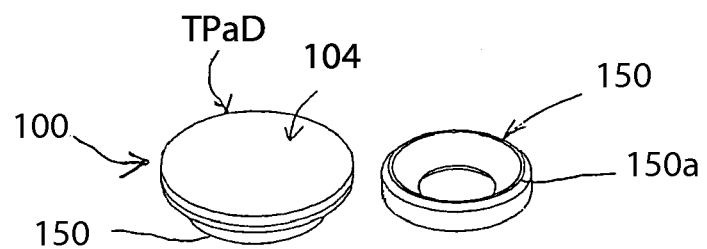
FIG. 1B
FIG. 1A
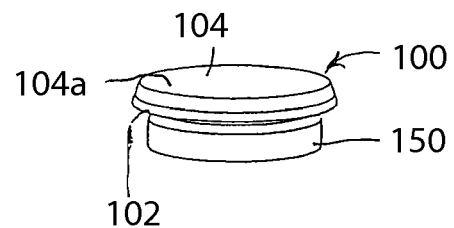
FIG. 2

Rightward movement with high friction    Leftward movement with low friction

HAPTIC DEVICE WITH CONTROLLED TRACTION FORCES

CROSS-REFERENCE TO RELATED APPLICATIONS

This application is a continuation of U.S. patent application Ser. No. 12/589,178, filed Oct. 19, 2009, which is a continuation-in-part of U.S. patent application Ser. No. 11/726,391, filed Mar. 21, 2007 and which issued as U.S. Pat. No. 8,405,618 on Mar. 26, 2013, and claims benefits and priority of U.S. Provisional Application No. 61/196,660, filed Oct. 20, 2008, wherein the entire disclosures of these related applications are incorporated herein by reference in their entirety.

CONTRACTUAL ORIGIN OF THE INVENTION

This invention was made with government support under Grant No. IIS-0413204 awarded by the National Science Foundation. The Government has certain rights in the invention.

FIELD OF THE INVENTION

The present invention relates to a haptic device that can provide a shear force on a user's finger or an object on the surface of the device.

BACKGROUND OF THE INVENTION

Copending application Ser. No. 11/726,391 filed Mar. 21, 2007, of common assignee discloses a haptic device having a tactile interface based on modulating the surface friction of a substrate, such as glass plate, using ultrasonic vibrations. The device can provide indirect haptic feedback and virtual texture sensations to a user by modulation of the surface friction in response to one or more sensed parameters and/or in response to time (i.e. independent of finger position). A user actively exploring the surface of the device can experience the haptic illusion of textures and surface features.

This haptic device is resistive in that it can only vary the forces resisting finger motion on the interface surface, but it cannot, for instance, re-direct finger motion.

It would be desirable to provide the variable friction benefits of this haptic device and also to provide shear forces to a user's finger or an object on the interface surface of the glass plate substrate.

SUMMARY OF THE INVENTION

The present invention provides a haptic device capable of providing a force on a finger or object in contact with a substrate surface by subjecting a substrate to lateral motion or lateral oscillation and modulation of a friction reducing ultrasonic oscillation in a manner to generate force. An embodiment of the present invention provides a haptic device comprising a substrate, one or more actuators for subjecting the substrate to lateral motion or lateral oscillation, and one or more other actuators for subjecting the substrate to friction reducing ultrasonic oscillation. A control device is provided for controlling the actuators in a manner to subject the substrate to lateral motion or oscillation and modulation of the friction reducing oscillation to create a force on the user's finger or on an object in contact with the substrate. Changing of the force in response to position of the user's finger or object on the substrate surface can provide a force field in the plane of the substrate surface.

In an illustrative embodiment of the invention, a planar (flat-panel) haptic device modulates friction to provide the variable friction (friction reducing) effect by using vertical ultrasonic vibrations of a horizontal substrate, such as a glass plate. The device also oscillates the substrate laterally in a horizontal plane with one degree of freedom (oscillation on one axis), two degrees of freedom (oscillation on two axes) or more while alternating between the low and high variable friction states to create a non-zero net time-averaged shear force on the user's finger or on an object in contact with the substrate. For example, for one degree of freedom of lateral oscillation, as the substrate moves in one direction in a horizontal plane, the friction is reduced (low friction state). As the substrate moves in the opposite direction, the friction is increased (high friction state). The net time-averaged force on the user's finger or on a part is non-zero and can be used as a source of linear shear force applied to a finger or to an object in contact with the surface.

For two degrees of freedom lateral oscillation (e.g. on x and y axes), the substrate may be moved in a swirling manner to provide circular, in-plane motion (in the plane of the substrate surface). As the substrate swirls, its velocity vector will at one instant line up with the desired force direction. Around that instant, the substrate is set to its high friction state and an impulse of force is thereby applied to the user's finger or to an object. During the remainder of the "swirl" cycle, the substrate is set to the low friction state so that it negligibly effects the force on the finger or object. Since the velocity vector passes through all 360° during the swirl, forces can be created in any in-plane direction.

Alternatively, in another embodiment, the substrate may be oscillated in a single direction in the horizontal plane, but this single direction may be changed to match the desired force direction at any instant. In still another embodiment of the invention, the substrate may be oscillated on three axes (x and y translations and an in-plane rotation about a vertical axis). It should further be understood that the lateral oscillations need not be sinusoidal, need not be of uniform amplitude, and need not continue indefinitely. For instance in another embodiment of the invention, a single lateral motion or a short series of lateral motions or displacements of the substrate may be used.

The present invention is advantageous to provide a haptic device that provides guiding forces to a user's fingers to enable the user to explore a display. Even an active propulsion of the user's finger may be of use to provide a compelling haptic experience. The present invention also is advantageous to provide a haptic device that provides guiding forces to one or more objects on the substrate in a manner to provide object or parts manipulation device for use in parts feeding, in robotic applications, and in manufacturing applications.

Advantages of the present invention will become more readily apparent from the following detailed description taken with the following drawings.

BRIEF DESCRIPTION OF THE DRAWINGS

FIG. 1A is a perspective view of a haptic device TPaD capable of variable friction effect. FIG. 1B is a perspective view of a mount for the haptic device TPaD.

FIG. 2 is a perspective view of the haptic device TPaD adhered in the mount.

DETAILED DESCRIPTION OF THE INVENTION

Figure 3:
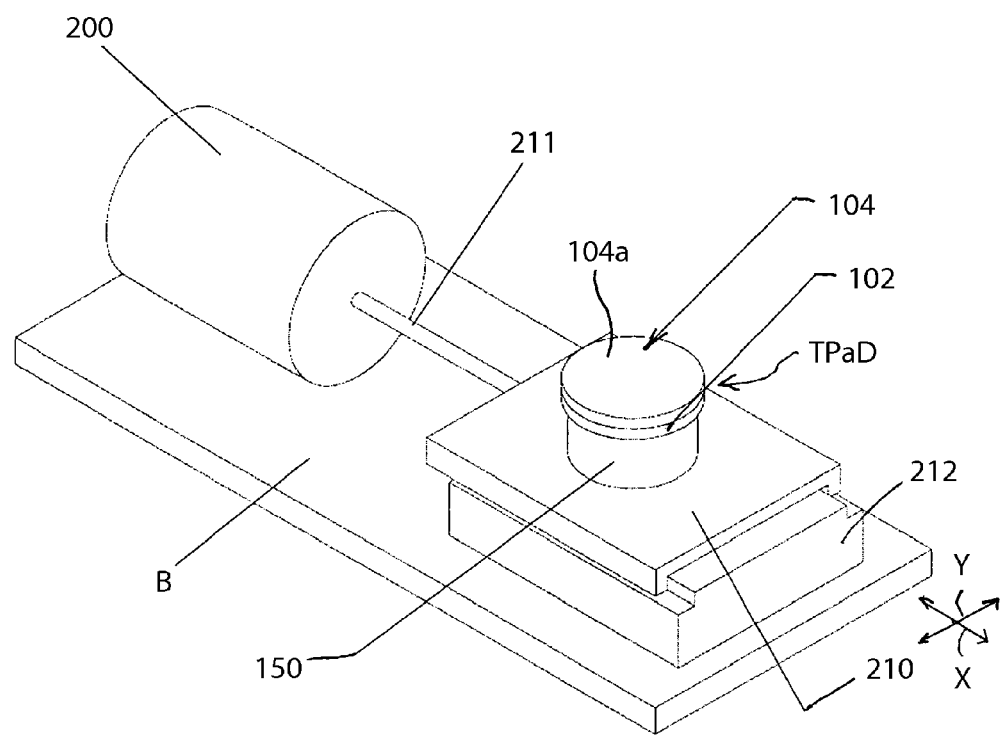
FIG. 3 is a schematic perspective view of a planar haptic device including the haptic device TPaD and other components pursuant to the invention.

The present invention provides a haptic device referred to hereafter as a surface haptic device (SHD) capable of providing a force on a finger or object in contact with a haptic substrate surface by subjecting the substrate to lateral motion or lateral oscillation and modulation of a friction reducing oscillation. An embodiment of the present invention provides a haptic device comprising a substrate such as a flat glass or other plate, one or more actuators for subjecting the substrate to lateral motion or lateral oscillation, and one or more other actuators for subjecting the substrate to friction reducing ultrasonic oscillation. The actuators are controlled in an embodiment by a computer control device to subject the substrate to lateral motion or lateral oscillation in synchrony with modulation of the friction reducing oscillation in a manner to create a shear force on the user's finger or an object in contact with the substrate surface. The present invention envisions subjecting the substrate to lateral motion or oscillation on a single axis (e.g. X axis) or on multiple (e.g. X and Y axes) axes as described below.

In an illustrative embodiment, the present invention can be practiced using a variable friction haptic device TPaD ("Tactile Pattern Display") of the illustrative type shown in FIGS. 1A, 1B and 2 having a substrate 100 with a working haptic surface and one or more actuators (vibrators) operably associated with the substrate in a manner to impart vibration (oscillation) thereto in a manner to provide a variable friction capability as described in copending U.S. application Ser. No. 11/726,391 filed Mar. 21, 2007, and copending U.S. application Ser. No. 12/383,120 filed Mar. 19, 2009, of common assignee, the disclosures of which is incorporated herein by reference. The variable friction haptic device VFHD of the copending application is referred to below as the variable friction haptic device TPaD.

Referring to FIGS. 1A, 1B and 2, a variable friction haptic device TPaD according to an illustrative embodiment of the invention is shown having a substrate 100 comprising a piezoelectric bending element 102 in the form of piezoelectric sheet or layer member attached to a passive substrate sheet or layer member 104 with a touch (haptic) surface 104a to provide a relatively thin laminate structure and thus a slim haptic device design that can provide advantages of slimness, high surface friction, inaudibility and controllable friction. A relatively thin haptic device can be made of a piezo-ceramic sheet or layer glued or otherwise attached to a passive support sheet or layer 104. When voltage is applied across the piezoelectric sheet or layer 102, it attempts to expand or contract, but due to its bond with the passive support sheet or layer 104, cannot. The laminate will have a curved shape with a single peak or valley in the center of the disk when the piezoelectric sheet or layer 102 is energized. The resulting stresses cause bending. The greater the voltage applied to the piezoelectric sheet or layer, the larger the deflection. When the piezoelectric bending element is excited by a positive excitation voltage, it bends with upward/positive curvature. When the piezoelectric bending element is excited by a negative excitation voltage, it bends with a downward/negative curvature. When sine wave (sinusoidal) excitation voltage is applied, the piezoelectric bending element will alternately bend between these curvatures. When the sine wave excitation voltage is matched in frequency to the resonant frequency of the substrate 100, the amplitude of oscillation is maximized. A mount 150 may be used to confine the bending to only one desired mode or to any number of desired modes. It is preferred that all mechanical parts of the haptic device vibrate outside of the audible range. To this end, the substrate 100 preferably is designed to oscillate at resonance above 20 kHz.

For purposes of illustration and not limitation, a thickness of the piezoelectric member 102 can be about 0.01 inch to about 0.125 inch. An illustrative thickness of the substrate member 104 can be about 0.01 to about 0.125 inch. The aggregate thickness of the haptic device thus can be controlled so as not exceed about 0.25 inch in an illustrative embodiment of the invention.

As shown in FIGS. 1A, 1B and 2, the disk-shaped haptic device is disposed in a mount 150 in order to confine the vibrations of the bending element disk to the 01 mode where the 01 mode means that the laminate has a curvature with a single peak or valley in the center of the disk when the piezoelectric sheet or layer is excited. The mount 150 can be attached to the piezoelectric disk along a thin ring or annular surface 150a whose diameter can be ⅔ of the diameter of the piezoelectric disk. The same very low viscosity epoxy adhesive can be used for the bond to the mount 150 as used to bond the piezoelectric disk and the glass substrate disk. The inner height of the mount 150 is somewhat arbitrary and can also be made as thin as a few millimeters. The mount 150 is adapted to be mounted on or in an end-use product such as including, but not limited to, on or in a surface of an motor vehicle console, dashboard, steering wheel, door, computer, and other end-use applications/products.

A transparent haptic device preferably is provided when the haptic device is disposed on a touchscreen, on a visual display, or on an interior or exterior surface of a motor vehicle where the presence of the haptic device is to be disguised to blend with a surrounding surface so as not be readily seen by the casual observer. To this end, either or both of the piezoelectric member 102 and the substrate member 104 may be made of transparent material. The piezoelectric element 102 includes respective transparent electrodes (not shown) on opposite sides thereof for energizing the piezoelectric member 102.

For purposes of illustration and not limitation, the substrate 104 may be glass or other transparent material. For the electrode material, thin films of the $In_2O_3$—$SnO_2$ indium tin oxide system may be used as described in Kumade et al., U.S. Pat. No. 4,352,961 to provide transparent electrodes. It is not necessary to employ transparent piezoelectric material in order to achieve a transparent haptic device. It will be appreciated that passive substrate sheet 104 may be made of a transparent material such as glass, and that it may be significantly larger in surface area than piezoelectric sheet 102. Piezoelectric sheet 102 may occupy only a small area at the periphery of passive substrate sheet 104, enabling the rest of passive substrate sheet 104 to be placed over a graphical display without obscuring the display. The piezoelectric material can include, but is not limited to, PZT (Pb(Zr, Ti)$O_3$)-based ceramics such as lanthanum-doped zirconium titanate (PLZT), (PbBa)(Zr, Ti)$O_3$, (PbSr)(ZrTi)$O_3$ and (PbCa)(ZrTi)$O_3$, barium titanate, quartz, or an organic material such as polyvinylidene fluoride.

Those skilled in the art will appreciate that the invention is not limited to transparent piezoelectric and substrate members and can be practiced using translucent or opaque ones, which can be colored as desired for a given service application where a colored haptic device is desired for cosmetic, security, or safety reasons. Non-transparent materials that can be used to fabricate the substrate member 104 include, but are not limited to, steel, aluminum, brass, acrylic, polycarbonate, and aluminum oxide, as well as other metals, plastics and ceramics.

Design of a circular disk-shaped haptic device TPaD will include choosing an appropriate disk radius, piezo-ceramic disk thickness, and substrate disk material and thickness. The particular selection made will determine the resonant frequency of the device. A preferred embodiment of a disk-shaped haptic device employs a substrate disk having a thickness in the range of 0.5 mm to 2 mm and made of glass, rather than steel or other metal, to give an increase in resonant frequency (insuring operation outside the audible range) without significantly sacrificing relative amplitude.

Those skilled in the art will appreciate that the design of the piezoelectric bending element 102 and substrate 104 are not constrained to the circular disk shape described. Other shapes, such as rectangular or other polygonal shapes can used for these components as will be described below and will exhibit a different relative amplitude and resonant frequency.

With respect to the illustrative disk-shaped haptic device TPaD of FIGS. 1A, 1B and 2, the amount of friction felt by the user on the touch (haptic) surface 104a of the haptic device is a function of the amplitude of the excitation voltage at the piezoelectric member 102. The excitation voltage is controlled as described in the Example below and also in copending application Ser. No. 11/726,391 filed Mar. 21, 2007, and copending application Ser. No. 12/383,120 filed Mar. 19, 2009, both of which are incorporated herein by reference. The excitation voltage is an amplitude-modulated periodic waveform preferably with a frequency of oscillation substantially equal to a resonant frequency of the haptic device. The control system can be used with pantograph/optical encoders or with the optical planar (two dimensional) positioning sensing system or with any other single-axis or with two-axis finger position sensors which are described in copending application Ser. No. 11/726,391 incorporated herein by reference, or with any other kind of finger position sensor, many of which are known in the art.

EXAMPLES

One Degree of Freedom Planar Haptic Device

Referring to FIG. 3, an illustrative planar surface haptic device SHD pursuant to an illustrative embodiment of the invention is shown incorporating the disk-shaped haptic device TPaD of FIGS. 1A, 1B and 2 hereafter referred to as TPaD. The disk-shaped haptic device TPaD was constructed using a single circular disk of piezoelectric bending element (Mono-morph Type) and a single circular disk of glass plate substrate to generate the ultrasonic frequency and amplitude necessary to achieve the indirect haptic effect of friction reduction. The piezoelectric bending element disk comprised PIC 151 piezo-ceramic material (manufactured by PI Ceramic, GmbH) having a thickness of one (1) millimeter and diameter of 25 millimeters (mm). The glass plate substrate disk comprised a thickness of 1.57 mm and a diameter of 25 mm. The piezo-ceramic disk was bonded to the glass substrate disk using a very low viscosity epoxy adhesive such as Loctite E-30CL Hysol epoxy adhesive. The disk-shaped haptic device was disposed in a mount made of aluminum and attached to the piezoelectric disk along a thin ring or annular surface 150a whose diameter was ⅔ of the diameter of the piezoelectric disk. The same very low viscosity epoxy adhesive was used for the bond to the mount 150 as was used to bond the piezoelectric disk and the glass substrate disk.

The haptic device SHD further includes a linear actuator 200, such as a voice coil, connected by coupling rod 211 to a linear slider 210 on which the haptic device TPaD fixedly resides for movement therewith. The TPaD can be held in fixed position on the slider 210 by any connection means such as a clamp, glue, screws, or rivets. The linear slider 210 is movably disposed on support 212 on a fixed base B for movement on a single X axis. A linear voice coil actuator 200 is sinusoidally activated at frequencies between 20 and 1000 Hz, causing the slider 210 and haptic device TPaD thereon to move oscillate laterally in the X-direction at the same frequency. When voice coil actuator 200 is sinusoidally activated at the resonant frequency of this system, the amplitude of lateral oscillations is increased although the invention is not limited to such sinusoidal activation.

Friction is modulated on the glass plate substrate surface 104a of the haptic device TPaD by applying a 39 kHz sinusoid to the piezoelectric element 102 mounted on the underside of the glass plate substrate 104. The 39 kHz signal is generated by a AD9833 waveform generator chip and amplified to +0-20V using an audio amplifier. When applied to the piezoelectric element 102, it causes resonant vibrations of the glass plate substrate. These vibrations produce a squeeze film of air underneath the fingertip, leading to a reduction of friction. At high excitation voltages, the friction between the glass plate substrate and a finger is approximately μ=0.15, while at zero voltage, the surface has the friction of normal glass (approximately μ=0.95).

Figure 4:
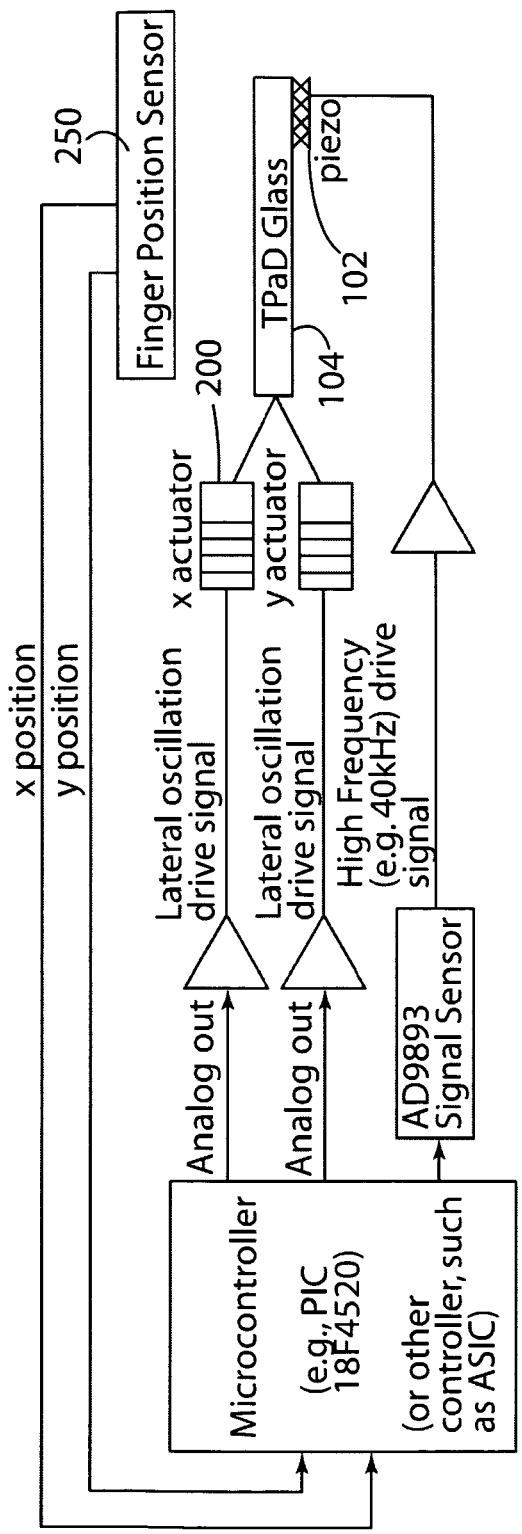
FIG. 4 is a schematic view of a control system for controlling the actuators in a manner to subject the substrate to lateral oscillation in synchrony with the friction reducing oscillation to create a shear force on the user's finger or an object in contact with the substrate.

A programmable integrated circuit (PIC-18F4520) generates the low frequency signal for the voice coil (x-actuator) and issues the command to the wave form signal generator (AD98330), FIG. 4, to start/stop the 39 kHz signal of the piezoelectric element 102. Since it provides both functions, it can dictate the phase relationship between the friction level of the haptic device TPaD and the lateral motion. A control system having a microcontroller with the PIC or other controller and finger position sensor 250 is shown in FIG. 4. FIG. 4 shows an X axis-actuator to oscillate the linear slider 210 on the X-axis and also a Y axis-actuator for use with a two degree-of-freedom planar haptic device described below where the TPaD is oscillated on the X-axis and Y-axis concurrently.

Figure 5:
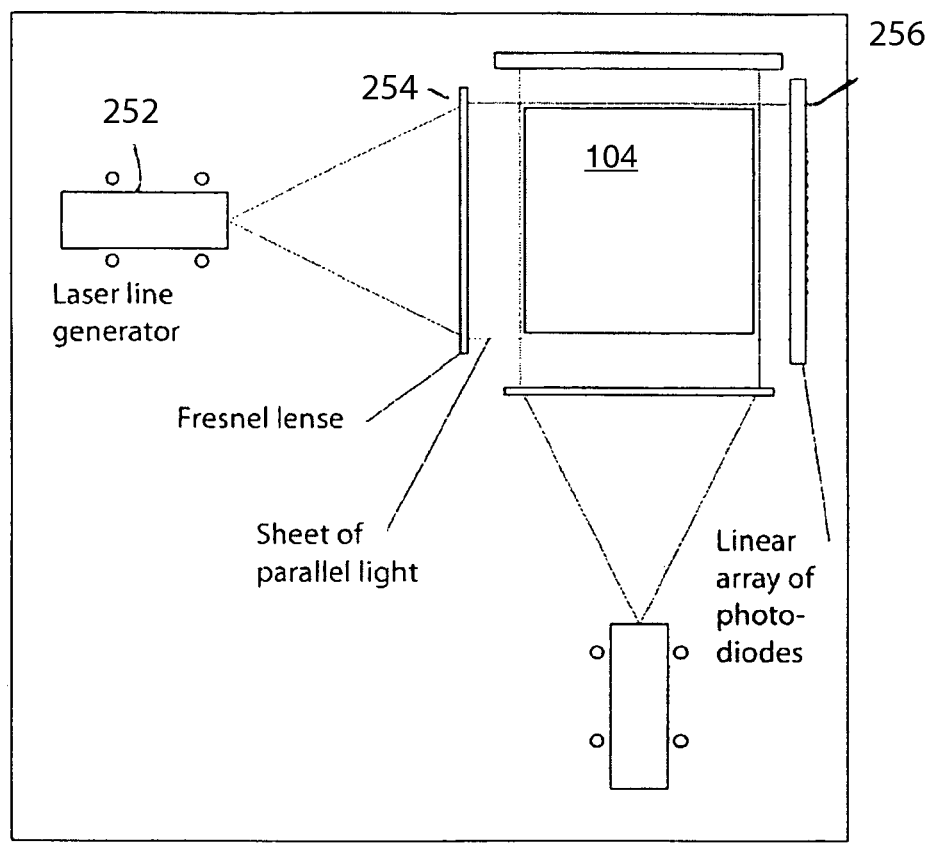
FIG. 5 is a schematic view of a finger position sensor system for use in practicing an embodiment of the invention.

To measure finger position, a single axis of the two-axis finger positioning system 250 can be used. This system is of a type similar to the two-axis finger position sensors which are described in copending application Ser. No. 11/726,391, however the infrared light emitting diodes of that system have been replaced with laser line generators 252 and Fresnel lenses 254 which produce a collimated sheet of light striking linear photo diode array 256, FIG. 5. The collimated sheet of light is placed immediately above the surface 104a of the TPaD and a finger touching the TPaD surface 104a interrupts that sheet of light, casting a shadow on linear photo diode array 256. A PIC microcontroller reads the output of the linear photo diode array 256 and computes the centroid of the finger's shadow, which is used as a measure of finger position.

Characterization of Force Generation

Figure 3A:
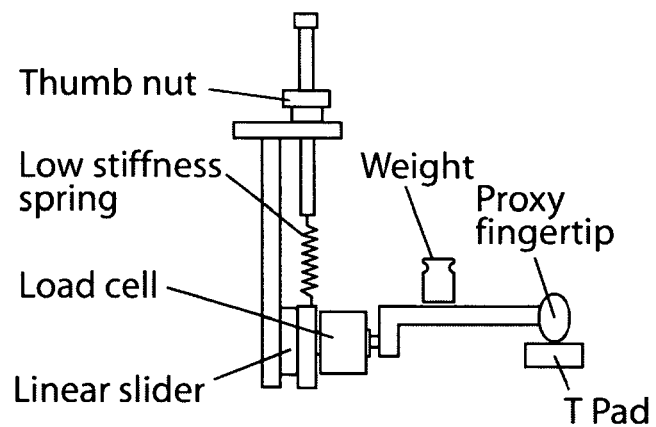
FIG. 3A is a view of a force measurement device used for measuring lateral force.

In the one degree-of-freedom embodiment, forces are created by alternating between low and high friction states at the same frequency that the haptic device TPaD is being oscillated laterally in-plane. To produce a net leftward force, the haptic device TPaD s set to high friction while its velocity is leftward and set to low friction when its velocity is rightward. The haptic device TPaD alternates between pushing the user's finger to the left and slipping underneath the finger back to the right. This "pushslip" cycle repeats itself, and the series of strong leftward impulses followed by weak rightward impulses results in a net force to the left. These impulses can be seen in the unfiltered force signal in FIG. 8, the lateral or shear force between the surface 104a of the SHD and the fingertip being measured using a one degree-of-freedom tension/compression load cell operably connected to a proxy fingertip as shown in FIG. 3A. The load cell can move vertically on a linear slider. The weight of the load cell and the fingertip is suspended by a low-stiffness spring. Vertical position of the fingertip is adjustable via a thumb nut. After the fingertip is lowered to within close proximity (less than 0.5 mm) of the TPaD, the normal force is controlled by adding weight to the L-shaped finger as shown. A normal load of 392 mN (40 g) was used for this Example. This arrangement allows force on the proxy finger, including the effects of lateral oscillations, to be measured with great accuracy. The proxy fingertip used in this Example comprised a grape wrapped in sandpapered electrical tape as the proxy finger pad. The proxy fingertip was secured to the L-shaped aluminum "finger" shown in FIG. 3A with electrical tape, and the aluminum finger was threaded onto the load cell. There is some compliance in the fingertip-to-finger connection, but since there is similar compliance in the human finger, this is appropriate.

Figure 3B:
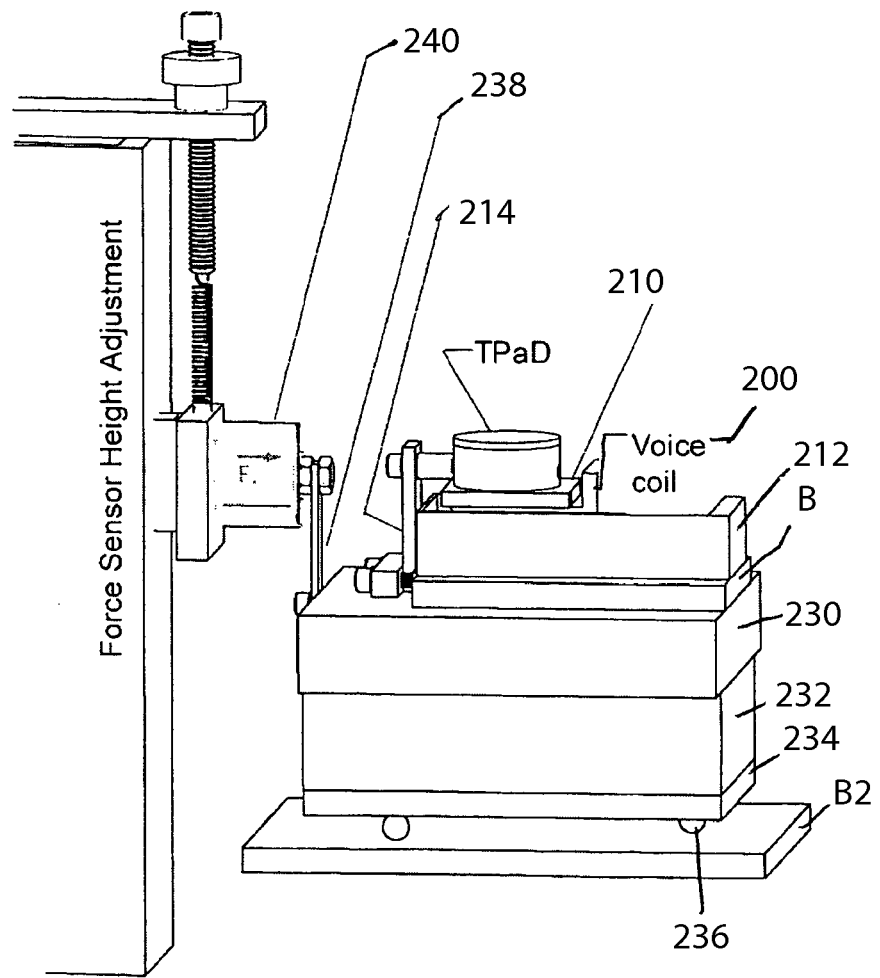
FIG. 3B is a view of an alternative force measurement device used for measuring lateral force.

Alternatively, the lateral or shear force between the surface 104a of the SHD and the fingertip also can be measured by mounting the base B on a support assembly that allows the entire assembly to move laterally with essentially no friction, FIG. 3B. For example, the base B can be mounted on a heavy brass mass or plate 230, which rests on sound insulating foam plate 232. The sound insulating foam plate 232 in turn rests on precision ground steel plate 234, which rests on three large steel balls 236. The steel balls in turn rest on a lowermost precision ground steel plate B2 that serves as the base of the measuring system. The brass mass or plate 230 is connected to load cell 240 via a low-stiffness spring 238 so that the only component restricting lateral motion is the load cell and so that all lateral forces acting on the finger must be matched by forces on the load cell. The combination of the mass of the brass mass or plate 230 and the low stiffness of spring 238 acts like a mechanical low pass filter so that lateral oscillations have minimal effect on the measurement of the load cell. As a consequence, the output of the load cell is an accurate measure of the average force on the fingertip.

Figures 6A, 6B:
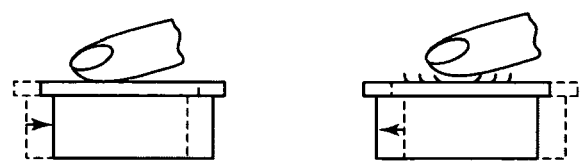
FIG. 6A is a schematic view showing rightward movement of the TPaD with high friction to create a rightward impulse on the finger.
FIG. 6B is a schematic view showing leftward movement of the TPaD with low friction to prepare for a another rightward impulse.

FIGS. 6A, 6B illustrate a similar "push slip" cycle to generate the opposite net force to the right wherein strong rightward impulses are followed by weak leftward impulses resulting in a net force to the right on a user's finger.

Figure 7:
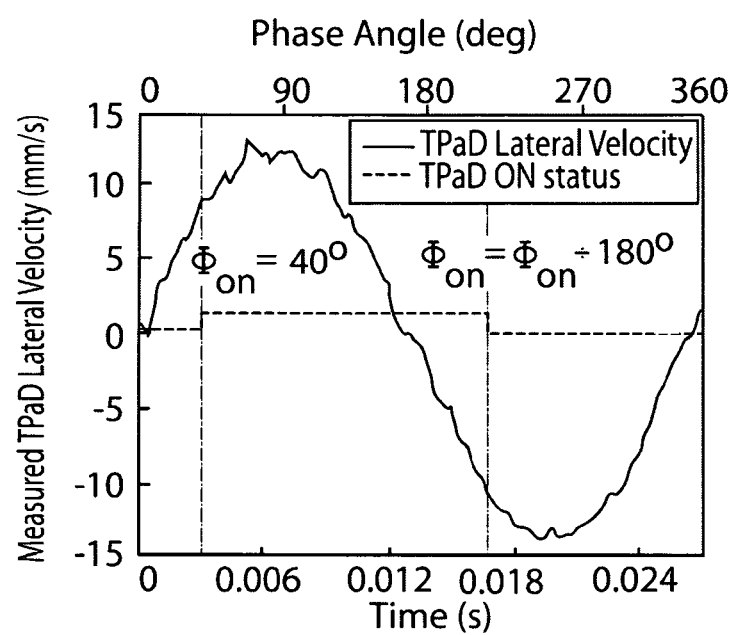
FIG. 7 shows force impulses in unfiltered force signals where TPaD turns on (low friction state) at $\Phi_{on}$=40° and remains in the on state for 180°.

The Effect of Phasing on Force:

By changing the phase angle between the lateral velocity and the haptic device TPaD on/off signal, the direction and magnitude of the net force can be changed. For explanation, the term $\Phi_{on}$ is defined as the phase angle of the lateral velocity when the haptic device TPaD turns on (low friction state on). This concept is shown graphically in FIG. 7. In all of the data presented, the TPaD is in the on state for half (180°) of the full cycle of lateral oscillation.

Figure 8:
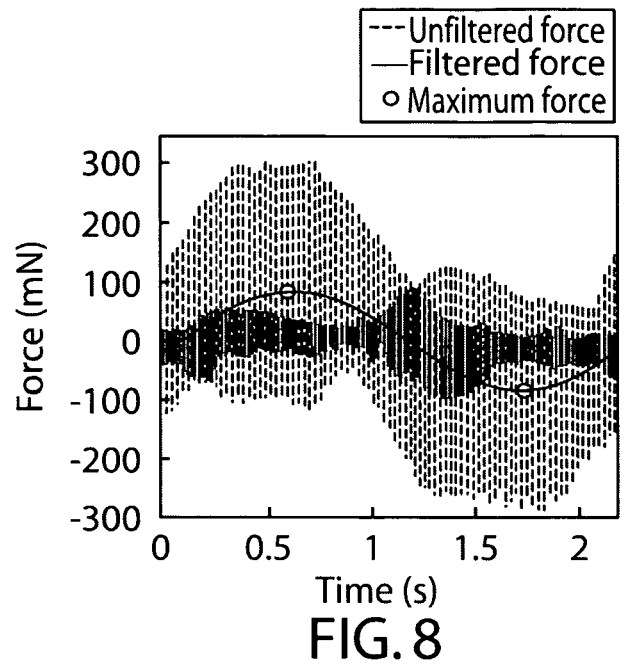
FIG. 8 shows net force changes as $\Phi_{on}$ is rotated over time where the unfiltered 40 Hz force signal has the same frequency as the lateral motion of the TPaD. The $\Phi_{on}$ is rotated through all phase angles at 0.5 Hz and the net (filtered) force changes accordingly. The circled maximum force points occur at the "optimum $\Phi_{on}$" values.

To determine which phasing creates the largest magnitude force, $\Phi_{on}$ was rotated slowly from 0 to 360° over the course of about 2 seconds. To find the net force, the unfiltered force data was passed through a second-order, lowpass, butterworth, zero-phase filter ($f_{cutoff}$=10 Hz). The filtered force signal is shown in FIG. 8. The circled maximum force points correspond to the two "optimum $\Phi_{on}$" values for this particular frequency and amplitude of lateral oscillation. These maximum net forces in the 100 mN range are easily perceivable to the applicants. Moreover, literature shows that this magnitude is generally perceivable to humans; see references [5] [1] [8].

Figure 9:
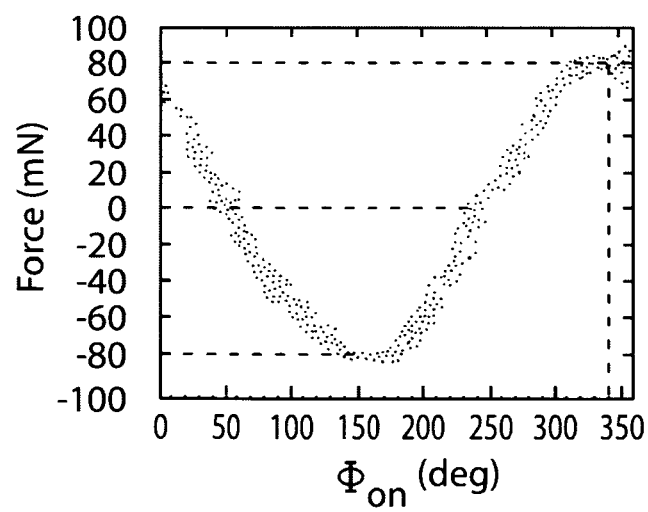
FIG. 9 shows a plot of the force versus $\Phi_{on}$ wherein as $\Phi_{on}$ is changed, the net force shifts from leftward to rightward and back again. The optimum $\Phi_{on}$ values that produce the maximum leftward and rightward forces are marked. Additionally, one of the two $\Phi_{on}$ values that produces zero net force is marked.

FIG. 8 shows that the net force changes as $\Phi_{on}$ is rotated over time. The $\Phi_{on}$ value in any given velocity cycle was found by comparing the TPaD status signal to the velocity signal in a manner similar to the comparison in FIG. 7. That data was then plotted against the filtered force data in FIG. 8. The result in FIG. 9 provides more specific information about the values of $\Phi_{on}$ that optimize force. Although the exact relationship between force and $\Phi_{on}$ is dependent on oscillation amplitude and frequency, this data is representative of a wide range of amplitudes that produce forces noticeable to a human. With no delays in the system, one would expect that turning the TPaD on at 0° would produce the largest leftward force and $\Phi_{on}$=180° would produce the greatest rightward force. The data shows that the optimum angles are instead $\Phi_{on}$=340°, and $\Phi_{on}$=160°, respectively. The need for this phase advance may be due to the time required to create and decay the squeeze film, although applicants do not intend or wish of be bound by any theory in this regard. Also note that zero net force is expected at $\Phi_{on}$=270° but occurs at $\Phi_{on}$=250°.

One skilled in the art will recognize that force can be controlled not just by phasing, but also by modulating the amount of time that the TPaD substrate is in the relatively high friction state. Force may be reduced by reducing the amount of a cycle for which friction is high.

Figure 10:
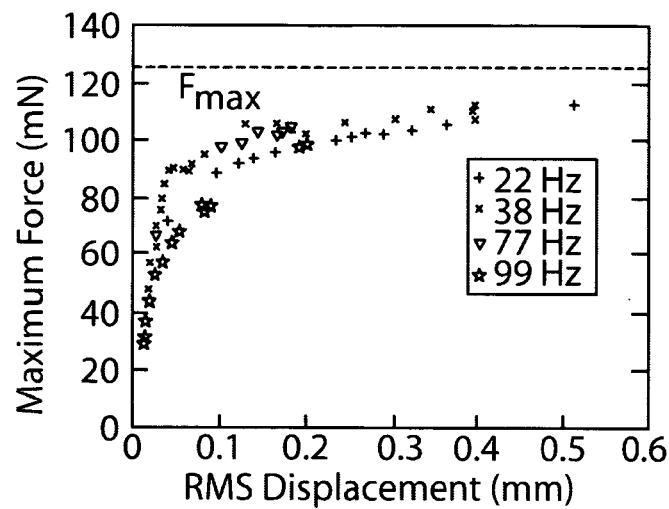
FIG. 10 is a plot of maximum force versus RMS (root mean square) displacement where the relationship between amplitude of oscillation and maximum net force for various lateral oscillation frequencies where $F_N$=392 mN, $\mu_{glass}$=0.70, and $\mu_{on}$=0.06.

The Effect of Oscillation Amplitude on Force:

It was found experimentally that as the amplitude of lateral displacement increases, the average net force increases proportionally at first and then saturates. FIG. 10 shows this trend for various lateral oscillation frequencies. Each data point represents the net force produced by a particular amplitude of oscillation at optimum $\Phi_{on}$.

The asymptotic behavior in FIG. 10 is due to the nature of coulomb friction. Once amplitudes are high enough to keep the finger and TPaD predominately in sliding contact, the finger will experience a force of $\mu_{glass} F_N$ when the velocity is in one direction and $-\mu_{on} F_N$ when velocity is in the other direction. Here, $\mu_{glass}$ is the kinetic coefficient of friction of the glass; $\mu_{on}$ is the kinetic coefficient of friction of the TPaD when it is in its lowest friction state; and $F_N$ is the normal force.

To find the theoretical maximum net force that the SHD can create, we assume that the finger experiences each of the two force levels for half of the total cycle. The time-averaged force is then just the simple average of the two force levels. Therefore, the equation for the maximum net force, F., is $$F_{max}=[(\mu_{glass}-\mu_{on})F_N]/2 \qquad \text{Eqn (1)}$$

The value of the asymptote line in FIG. 10 is calculated using Eqn 1, where $\mu_{glass}=0.70$ was found by recording the maximum force while sweeping the proxy finger across the surface while the TPaD and lateral oscillator are quiescent; $\mu_{on}=0.06$ was found similarly but with the TPaD turned on; and $F_N=392$ mN was from 40 g of weight.

Frequency Selection:

It is important to note that since the force is applied in impulses at frequencies between 20 and 1000 Hz, the user is aware of not only the overall force in one direction, but also the undesirable underlying vibration of the TPaD. It is well known in the field of psychophysics that the human fingertip is sensitive to vibrations in the range of 20 Hz to about 500 Hz, with a peak in sensitivity at about 250 Hz. We have found the best performance of the SHD to be either at high frequencies (e.g., 850 Hz) where the lateral vibrations are not very noticeable, or at about 40 Hz where the vibrations are noticeable but not unpleasant.

A design method for reducing the finger's exposure to the lateral vibration is to keep the TPaD continually turned on (low friction state on) until a force production is needed. In this strategy the squeeze film isolates the user from the underlying low frequency vibration making it almost unnoticeable until force is applied. Another method is to turn off the lateral vibrations except when they are needed.

The Effect of Finger Exploration Velocity:

When the amplitude of oscillation is large enough to bring the forces near $F_{max}$, increasing amplitude further provides negligible increase to the force on a stationary finger. On the other hand, if the user is actively exploring the surface, their finger velocity could cause the relative velocity between the finger and plate to become small, reducing the net force. Therefore, the higher the finger exploration velocities, the higher the oscillation amplitude required to maintain the target force.

Figure 11:
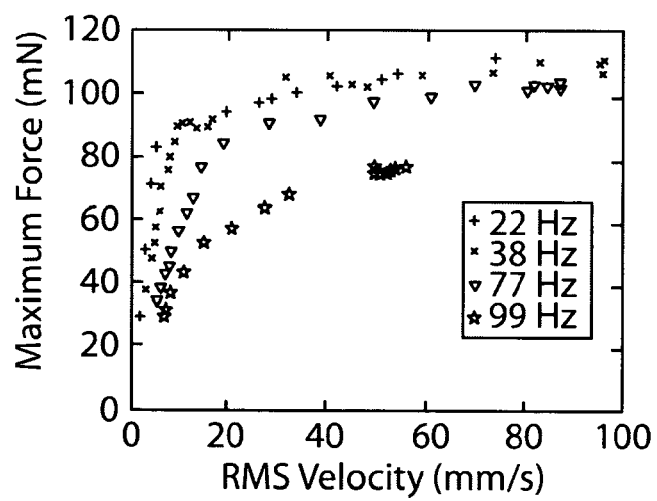
FIG. 11 is a replot of the data of FIG. 10 as a function of TPaD RMS velocity.

An idea for acceptable finger exploration velocities can be gained by plotting the same data in FIG. 10 against velocity instead of displacement. In FIG. 11, it can be seen that a TPaD oscillating at 77 Hz reaches about 85% of maximum force production around 20 mm/s RMS velocity. In FIG. 11, the force produced by 77 Hz oscillation is seen to be very sensitive to changes in RMS velocity below 20 mm/s, but insensitive above 20 mm/s. Therefore, it is believed that the forces produced by a SHD oscillating at 20 mm/s are susceptible to finger velocity changes, but a SHD running at 60 mm/s will allow the finger to travel at speeds up to about 40 mm/s before a significant reduction in force occurs.

Figure 12:
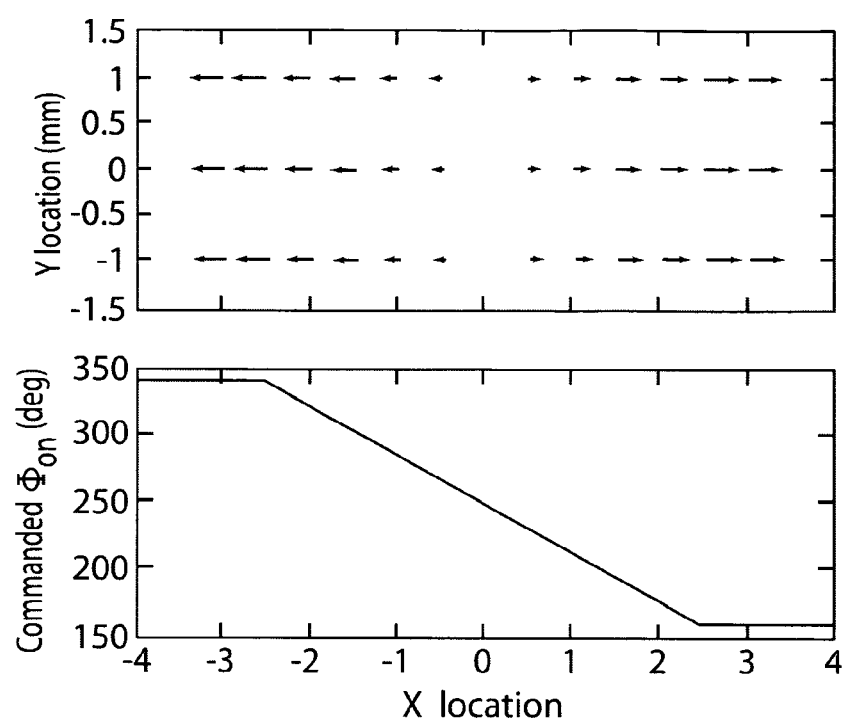
FIG. 12 illustrates a line-source force field and the $\Phi_{on}$ request that the SHD controller uses to generate the line-source field.

Displaying Force Fields:

Since the SHD is effectively a source of force, it is possible to create or display any arbitrary force field. One could chose to display a spring, damper, or other primitive, but for the sake of example we will describe the display of line sinks and sources. At any given moment in time, the device has a constant force field across its surface, so to create the perception of a spatially varying force field, it is necessary to change force as a function of finger position. In practice, as the finger moves across the surface, $\Phi_{on}$ is adjusted to produce the force of desired direction and magnitude. In FIG. 12, a top-view is provided of what a line-source force field looks like, and the $\Phi_{on}$ command used to generate such a field.

Note the similarities between the commanded $\Phi_{on}$ in FIG. 12 and the Force versus $\Phi_{on}$ relationship in FIG. 9. To create a line source, one wants zero force along the centerline, so $\Phi_{on}=250°$ at $x=0$. On the right and left edges of the vector field where maximum force is required, the $\Phi_{on}$ command takes on the optimum $\Phi_{on}$ angles of 340° and 160°.

Figure 13:
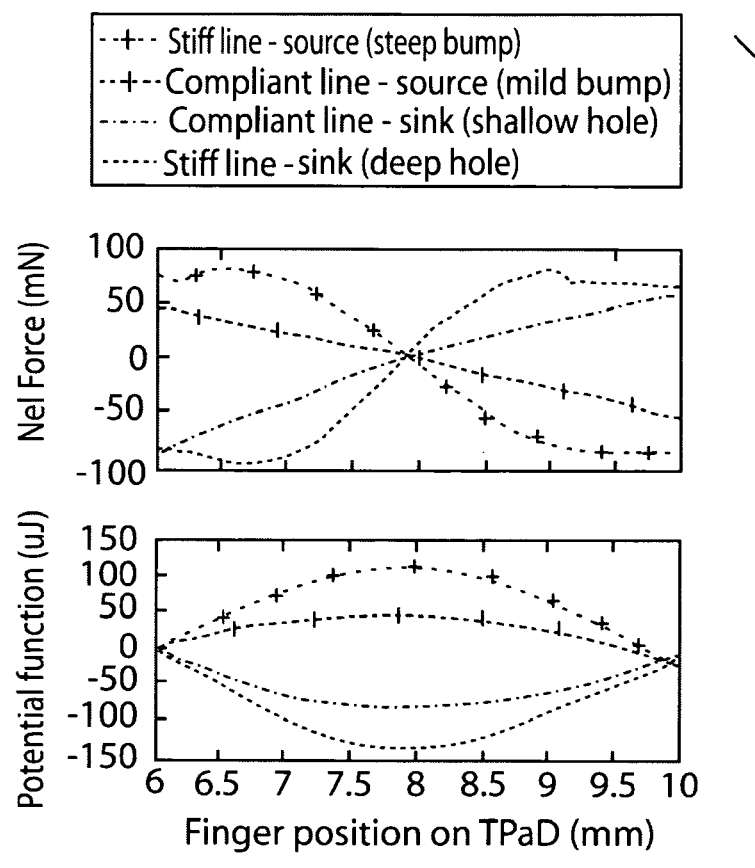
FIG. 13 shows the data, net force versus finger position on the TPaD, from four different force fields comprising two line source force fields and two line-sink force fields.

Force Fields:

FIG. 13 shows the data from four different force fields. There are two line-sources and two line-sinks, each of which has a "stiff and "compliant" version. The raw data has been provided in the force vs. position format, but to provide a more intuitive idea for the tactile experience, applicants have also integrated the data to form the "potential function". The potential function is defined as $V(x)=\int F(x)dx$, where $F(x)$ is the force on the finger as a function of position, x. The results from Robles-De-La-Torre and Hayward references [6] [5] suggest that the shape of the potential function is similar to the perceived shape of a virtual bump or hole.

When viewing the data from the perspective of the potential function, instead of seeing a stiff planar line-source, one sees a steep bump in the surface. Similarly, the compliant planar line-sink can be thought of as a shallow hole in the surface.

Figure 14A:
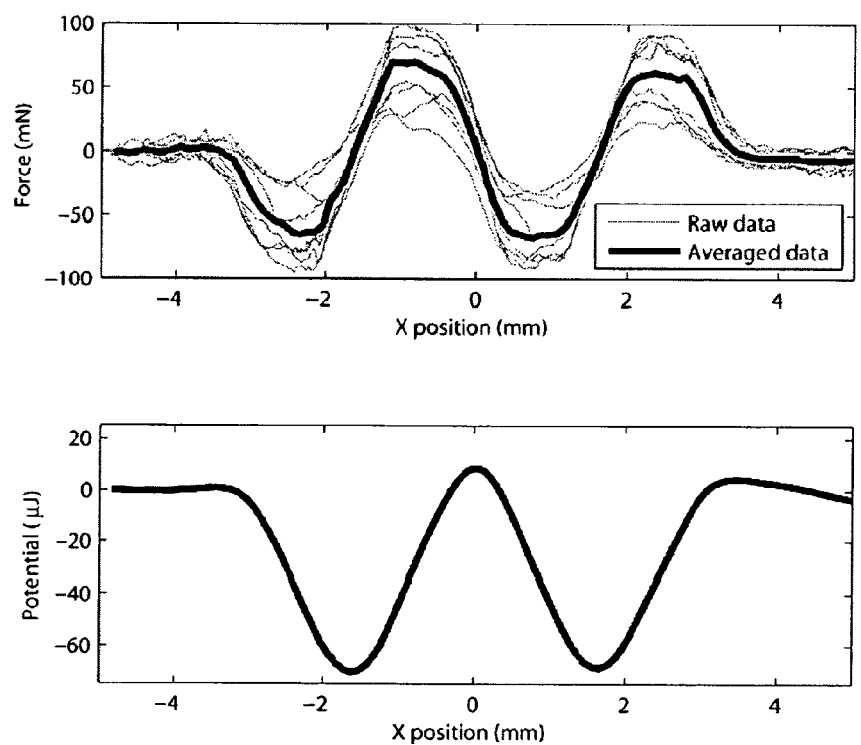
FIG. 14A shows plots of potential and force versus x axis position.
Figure 14C:
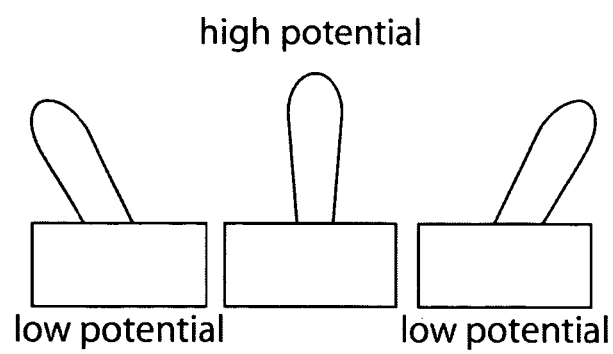
FIG. 14C shows schematically a haptic toggle switch effect.
Figure 14B:
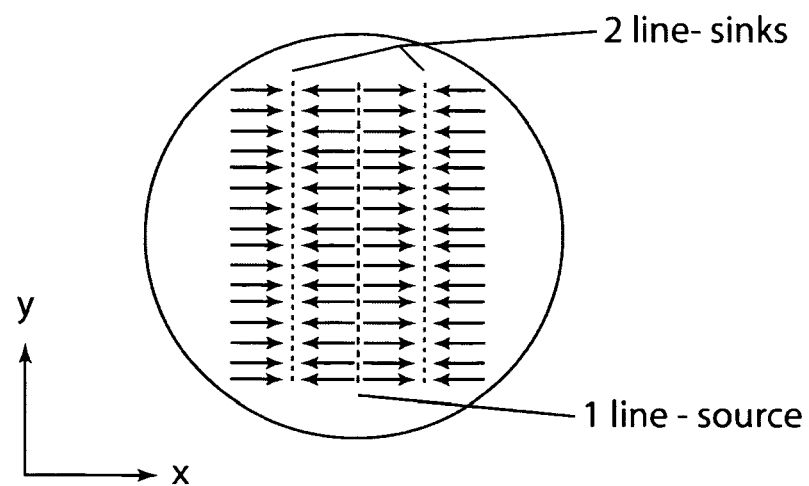
FIG. 14B is a plan view of 2 line-sinks (force fields) and 1 line-source (force field).

It is possible to build on the potential function concept to create more sophisticated haptic behaviors, such as the toggle switch illustrated in FIGS. 14A, 14B, and 14C. The haptic toggle switch is two low potential regions (sinks) separated by a high potential region (source), FIGS. 14A, 14B. When sliding the finger from one low potential region toward the next, the finger tends to "pop" into the low potential region, much like flipping a physical toggle switch, FIG. 14C.

The illustrative planar (flat panel) haptic display SHD described above is capable of applying and controlling the net shear force on a finger. As with any controllable force source, it allows one to display force fields of one's choosing when coupled with finger position feedback. The capability of displaying line sources and sinks has been demonstrated and they can be viewed as planar entities, or 3D protrusions and depressions. It can be extrapolated that the SHD is a tool capable of displaying planar springs, dampers, masses, and the illusions of surface features.

The illustrative haptic device SHD provides a planar haptic display capable of applying any arbitrary shear force to a finger. It would have the capability of displaying a two dimensional (2D) world composed of springs, dampers, masses, and other forces, but also, by using the idea that lateral force can create the illusion of shape, the SHD can produce the illusion of three dimensional (3D) textures and shape on its 2D surface.

Two Degree of Freedom Planar Haptic Device

A planar haptic device having two degrees of freedom of oscillation of the substrate can be constructed in view of the above description of the one degree-of-freedom illustrative haptic device SHD of FIG. 3.

For two degrees of freedom in-plane oscillation, the haptic device TPaD shown in FIG. 3 can be oscillated in-plane on multiple axes such on the X axis and the Y axis. For example, two degrees of freedom of motion are provided by designing a compound slider on which the haptic device TPaD resides to slide on orthogonal X and Y axes, see X and Y axes on FIG. 3. The compound slider would have the capability to move the haptic device TPaD independently on the X axis and Y axis. For example, the compound slider would have a first slider like slider 210 for X axis oscillation and a second slider mounted on or underneath the first slider for independent Y axis oscillation. The first slider would be actuated to oscillate on the X axis by linear actuator 200 shown and the second slider would be actuated to oscillate on the Y axis by a second linear actuator (not shown) in the form of a similar speaker having an actuator rod connected to the Y-axis slider. A finger position sensor of the type shown in FIG. 5 can be used to sense X and Y finger positions for input to a control system that changes the phase angle $\Phi_{on}$ between lateral velocities of the substrate and the TPaD on/off signal as desired to generate shear forces.

This embodiment for two degrees of freedom thus involves having separate actuators for oscillating the TPaD on the X axis and Y axis. Electromagnetic actuators (such as voice coils), piezoelectric bending actuators, shape memory alloy actuators, artificial muscle actuators (http://www.artificial-muscle.com/) and others are possible choices for these actuators. In general, it will minimize the actuator effort required if the haptic device TPaD and its mount 150 are resonant for both X and Y vibrations at the frequency of oscillation.

Oscillation of the haptic device TPaD on the X axis and Y axis may be controlled to generate a swirling motion of the substrate in a manner to create a circular, in-plane motion (in the plane of the substrate surface 104a). As the substrate swirls, its velocity vector will at one instant line up with the desired force direction. Around that instant, the substrate is set to its high friction state and an impulse of force is applied to the user's finger or an object. During the remainder of the "swirl" cycle, the substrate is set to the low friction state so that it negligibly affects the force on the finger or object. Since the velocity vector passes through all 360° during the swirl, forces can be created in any in-plane direction. In this embodiment of the invention, the ultrasonic vibrations normal to the substrate are combined with a lower frequency, higher amplitude lateral vibration (i.e. motions in the plane of the surface to generate the "swirls") as described.

As a consequence, each point on the glass plate surface of the haptic device TPaD will execute a small, circular, counterclockwise (looking from above) motion in the X-Y plane to generate the swirling pattern of motion. The swirling motion is completely analogous to the X-direction oscillations generated above by linear actuator 200 in the sense that the same considerations of frequency and amplitude apply. However, because the motion now occurs along two axes of glass plate substrate, the effect of friction modulation is not the same. In particular, the net force never goes to zero (or changes in magnitude), it simply changes direction. Also, because the force is always in the same direction as the velocity of the device, and that velocity is constantly changing, the average force will not be as large as in the single axis embodiment. It can be shown, assuming friction dependence as above, that the average force has magnitude $(\mu_{on}N)/\pi$ and a direction of $\Phi$.

The phase(s) of the swirling motion during which the ultrasonic vibration for friction reducing is switched on or off (or modulated) can be varied under computer control to create edges or other haptic effects. The modulation can be in response to measured finger position, or for some haptic effects a measurement of finger position is not necessary.

Figure 15:
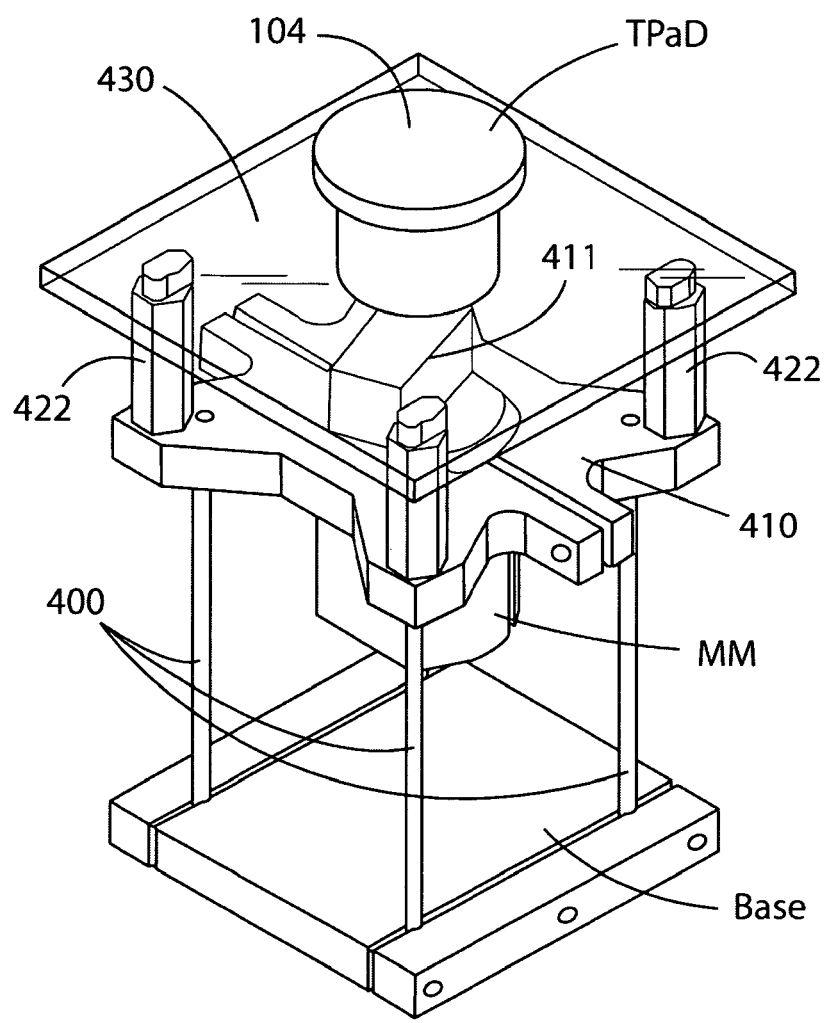
FIG. 15 is a schematic view of a two degree-of-freedom haptic device where the haptic device TPaD is mounted on a compliant support.

Another embodiment of the present invention for a two degree-of-freedom haptic device SHD is shown in FIG. 15 and involves mounting the haptic device TPaD on a compliant support such as a motor mount 410 supported on flexible metal legs 400 so that the haptic device TPaD is free to move around within some limits as needed. The flexible legs 400 are connected at the bottom to a fixed base. The TPaD is fixedly mounted on a mounting plate 430 that is connected rigidly by corner posts 422 to the motor mount 410. An eccentric mass motor MM (such as those used in pagers) can be mounted on the motor mount 410 and includes eccentric mass 411. The motor's output shaft axis is normal to the TPaD haptic surface. The eccentric mass motor MM via its output shaft spins the eccentric mass to produce a rotating reaction force at the frequency of rotation. This, in turn, will cause the motor mount 410 and the TPaD substrate 104 thereon to vibrate in a swirling pattern.

Embodiments of the invention described allow computer (software)-controlled haptic effects to be displayed on the glass plate substrate surface, including not only variable friction but also lateral forces that actively push the finger or object across the surface. Stronger haptic effects are possible. An additional use is also possible, not as a haptic display but instead as a mechanism for driving small objects around a surface under computer control, as might be useful in parts feeding or similar applications in robotics or manufacturing.

In the described embodiments, the haptic device TPaD is ultrasonically vibrated for the friction reduction effect as one unit. As an alternative embodiment, more than one ultrasonic actuator can be used so that different areas of the glass plate surface have different ultrasonic amplitudes, perhaps each modulated to correspond to different phases of the swirly motion. Another way to attain spatial variation of ultrasonic amplitude across the glass plate surface, is to make use of the nodal patterns of ultrasonic vibration (see copending application Ser. No. 12/383,120 filed Mar. 19, 2009, or to combine this with more than one ultrasonic frequency, or with ultrasonic actuators driven with different phases.

It should be appreciated that the present invention is not limited to planar substrate surfaces. For example, the traction forces could be generated at the surface of a cylindrical knob by creating ultrasonic vibrations in the radial direction, and "lateral" oscillations in the axial and/or circumferential directions. Indeed, any surface will have a surface normal and two axes that lie in the surface, at least locally. Ultrasonic vibration along the normal and lower frequency vibration along one or two in-surface axes can be coordinated to generate traction forces.

There is no reason that the lateral oscillations need to be persistent. In many applications, it is necessary to apply active traction forces for brief instants only. In such cases, the lateral oscillations can be turned off until they are needed to generate the traction force. Indeed for some haptic effects only a single cycle or even only a half-cycle of a lateral oscillation may suffice. The amplitude or number of lateral oscillations may be selected to be sufficient to move the user's finger a desired distance, or to apply a force to it for a desired duration, and then the lateral oscillations may be discontinued.

Although the invention as been described with respect to certain illustrative embodiments thereof, those skilled in the art will appreciate that changes and modifications can be made thereto within the scope of the invention as set forth in the pending claims.

References

[1] M. Biet, F. Giraud, and B. Lemaire-Semail. Implementation of tactile feedback by modifying the perceived friction. *European Physical Journal Appl. Phys.*, 43:123135, 2008.

[2] S. M. Biggs, S. *Haptic Interfaces*, chapter 5, pages 93-115. Published by Lawrence Erlbaum Associates, 2002.

[3] M. Minsky. *Computational Haptics: The Sandpaper System for Synthesizing texture for a force-feedback display*. PhD thesis, Massachusetts Institute of Technology, Cambridge, Mass., 1995.

[4] J. Pasquero and V. Hayward. Stress: A practical tactile display with one millimeter spatial resolution and 700 hz refresh rate. Dublin, Ireland, July 2003.

[5] G. Robles-De-La-Torre. Comparing the Role of Lateral Force During Active and Passive Touch: Lateral Force and its Correlates are Inherently Ambiguous Cues for Shape Perception under Passive Touch Conditions. pages 159-164, 2002.

[6] G. Robles-De-La-Torre and V. Hayward. Force can overcome object geometry in the perception of shape through active touch. *Nature*, 412:445-448, July 2001.

[7] M. Takasaki, H. Kotani, T. Mizuno, and T. Nara. Transparent surface acoustic wave tactile display. *Intelligent Robots and Systems, 2005. (IROS 2005). 2005 IEEE/RSJ International Conference on*, pages 3354-3359, August 2005.

[8] V. Vincent Levesque and V. Hayward. Experimental evidence of lateral skin strain during tactile exploration. In *Proc. of Eurohaptics*, Dublin, Ireland, July 2003.

[9] T. Watanabe and S. Fukui. A method for controlling tactile sensation of surface roughness using ultrasonic vibration. *Robotics and Automation. 1995. Proceedings., 1995 IEEE International Conference on*, 1:1134-1139 vol. 1, May 1995.

[10] L. Winfield, J. Glassmire, J. E. Colgate, and M. Peshkin. T-pad: Tactile pattern display through variable friction reduction. *World Haptics Conference*, pages 421-426, 2007.

[11] A. Yamamoto, T. Ishii, and T. Higuchi. Electrostatic tactile display for presenting surface roughness sensation. pages 680-684, December 2003

The invention claimed is:

1. A haptic device comprising a substrate having a surface, one or more actuators that subject the substrate to lateral oscillation, and one or more other actuators that subject the substrate to friction reducing ultrasonic oscillation in a direction normal to the substrate surface, wherein synchronization of the lateral motion and the friction reducing ultrasonic oscillation generates a net shear force on a user's finger or an object in contact with the substrate surface.

2. The device of claim 1 wherein the net shear force is an average of a higher shear force over a portion of a lateral oscillation cycle, and a lower shear force over a remainder of the lateral oscillation cycle.

3. The device of claim 1 including a control device that controls the lateral motion in synchrony with modulation of the friction reducing oscillation.

4. The device of claim 1 wherein the one or more actuators subject the substrate to lateral oscillation on a single axis.

5. The device of claim 1 wherein the one or more actuators subject the substrate to lateral oscillation on two axes.

6. The device of claim 1 wherein the one or more actuators subject the substrate to lateral oscillation on three axes, one of said axes being rotational.

7. The device of claim 3 wherein a phase angle between lateral velocity of the substrate and the modulation of the friction reducing oscillation is changed to change the direction of the force.

8. The device of claim 1 wherein the one or more actuators impart a non-straight line motion to the substrate.

9. The device of claim 8 wherein the one or more actuators impart a lateral circular motion to the substrate.

10. The device of claim 1 wherein the one or more other actuators impart modulated ultrasonic oscillation to the substrate in a direction normal to the substrate surface, thereby creating friction reducing effects.

11. The device of claim 1 wherein the substrate comprises a flat plate.

12. A method of generating a force on a user's finger or an object in contact with a surface of a substrate of a haptic device, comprising subjecting the substrate to lateral oscillation, subjecting the substrate to friction reducing ultrasonic oscillation in a direction normal to the substrate surface, and controlling synchronization of the lateral oscillation and modulation of the friction reducing oscillation to generate the force as a shear force on the user's finger or object in contact with the substrate surface.

13. The method of claim 12 wherein the lateral oscillation occurs once.

14. The method of claim 12 wherein the lateral oscillation occurs a plurality of times.

15. The method of claim 12 wherein the lateral oscillation is persistent.

16. The method of claim 12 wherein the substrate is laterally moved or oscillated on a single axis.

17. The method of claim 12 wherein the substrate is laterally moved or oscillated on two axes.

18. The method of claim 12 wherein the substrate is laterally moved or oscillated on three axes, one of them being rotational.

19. The method of claim 12 wherein the substrate is sinusoidally laterally oscillated.

20. The method of claim 12 wherein a phase angle between lateral velocity of the substrate and an on or off state of the friction reducing oscillation is changed to change a direction and magnitude of the force.

21. The method of claim 12 wherein the substrate is laterally oscillated on two axes to provide a non-linear motion thereof.

22. The method of claim 21 wherein the non-linear motion comprises circular motion of the substrate.

23. The method of claim 12 wherein the shear force is a net shear force that is an average of a higher shear force over a portion of a lateral oscillation cycle, and a lower shear force over a remainder of the lateral oscillation cycle.

24. The method of claim 12 wherein the substrate comprises a flat plate.

25. The method of claim 12 including changing the force in response to position of the user's finger or object to provide a force field in the plane of the substrate surface.

26. The method of claim 12 wherein the substrate is alternately subjected to a relatively high friction state and a lower friction state.

27. The method of claim 12 including modulating an amount of time that the substrate is at a relatively high friction state.

* * * * *